United States Patent [19]

Taylor

[11] 4,059,941
[45] Nov. 29, 1977

[54] TRAILER HITCH FOR A TOBACCO HARVESTER

[76] Inventor: Oren M. Taylor, Highway 701 South, Elizabethtown, N.C. 28337

[21] Appl. No.: 684,227

[22] Filed: May 7, 1976

[51] Int. Cl.² .......................................... A01D 45/16
[52] U.S. Cl. .................................. 56/27.5; 56/16.6; 214/41 R
[58] Field of Search ..................... 56/27.5, 15.9, 14.9, 56/15.6, 228, 16.6, 202, 15.3; 214/41, 83.24

[56] References Cited
U.S. PATENT DOCUMENTS

| 795,443 | 5/1905 | Odell | 214/41 X |
| 2,944,377 | 7/1960 | Frieburg | 56/15.9 X |
| 3,133,397 | 5/1964 | Halls | 56/15.3 X |
| 3,885,376 | 5/1975 | Johnson | 36/77.5 |

FOREIGN PATENT DOCUMENTS 640,313  5/1962  Italy ...................................... 314/41

Primary Examiner—Jay N. Eskovitz
Attorney, Agent, or Firm—Sughrue, Rothwell, Mion, Zinn and Macpeak

[57] ABSTRACT

A trailer having a tobacco receiving box thereon is connected to a tobacco harvester which in turn may be pulled by a tractor or which may be self-propelled. The trailer is connected to the tobacco harvester by a hitch at one side of the harvester for forward and rearward movement of the trailer relative to the direction of movement of the harvester so as to evenly distribute the tobacco being delivered from the harvester into the tobacco box on the trailer. A double acting hydraulic piston and cylinder is connected to one end of a pivoted lever, the opposite end of which is connected to the trailer tongue, for oscillating the lever and reciprocating the trailer forwardly and rearwardly relative to the tobacco harvester.

3 Claims, 3 Drawing Figures

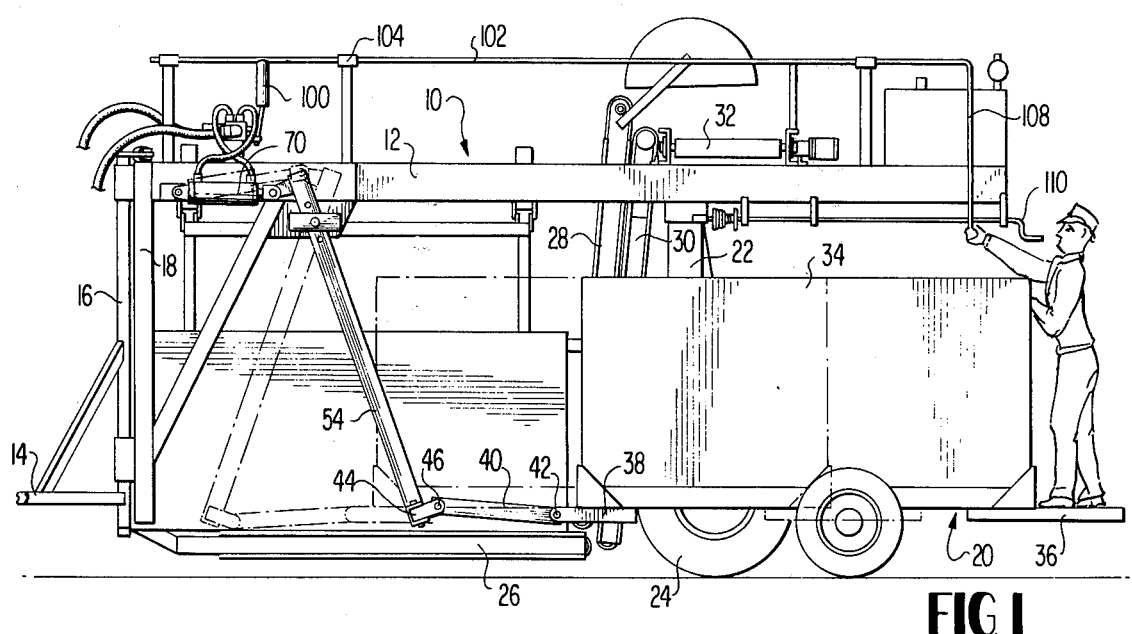
FIG 1
FIG 2
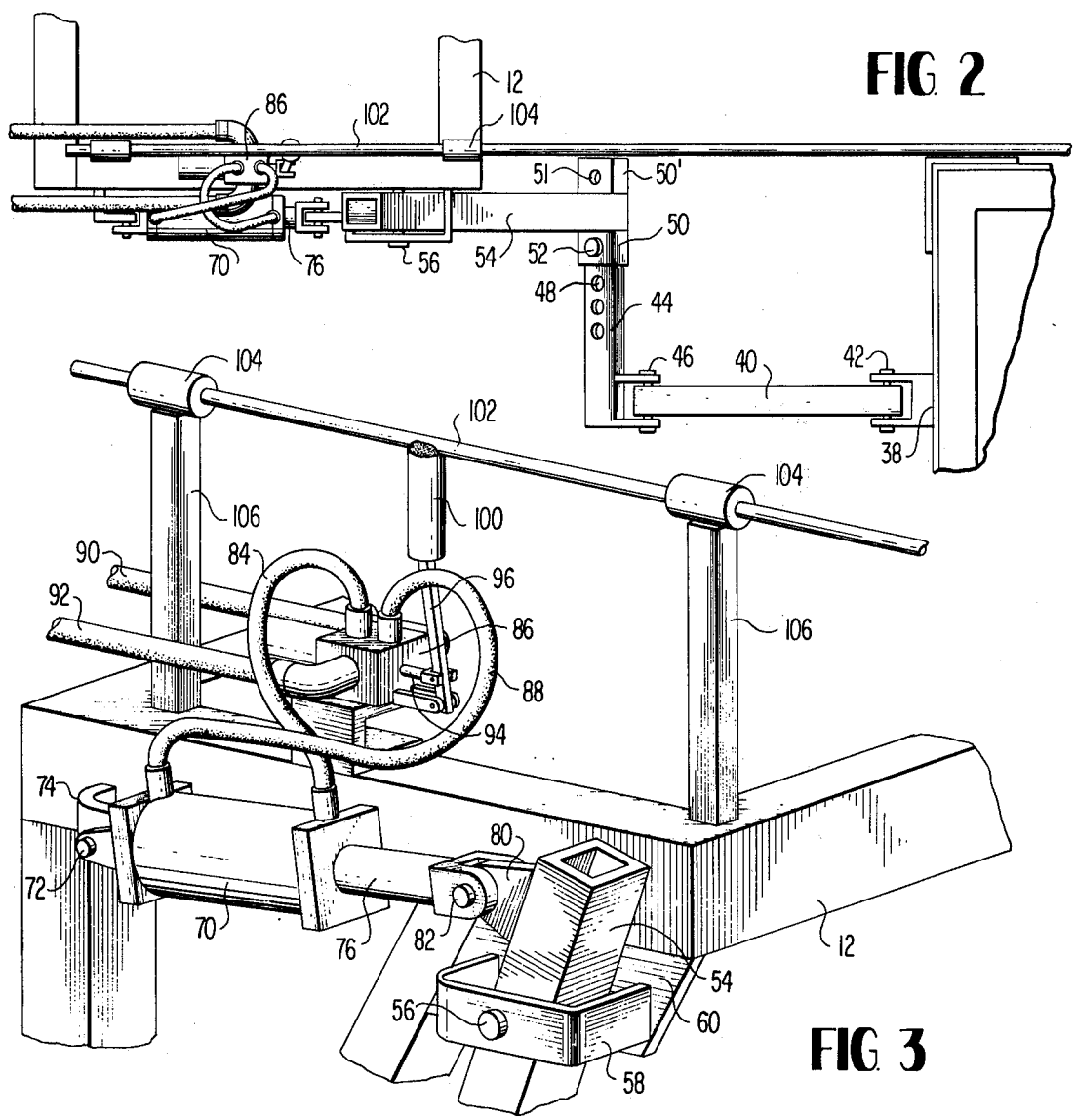
FIG 3

TRAILER HITCH FOR A TOBACCO HARVESTER

BACKGROUND ON THE INVENTION

1. Field of the Invention

The present invention is directed to trailer hitches and more specifically to a trailer hitch capable of imparting forward and rearward movement to the towed vehicle relative to the towing vehicle.

2. Prior Art

For many years the harvesting of tobacco has been a manual operation. The tobacco must be harvested at a particular time in the growing season and the leaves of the plant ripened different times. The leaves ripen progressively from the bottom to the top of the stalk thereby necessitating five or six successive passes through the field to remove the ripened leaves. Such manual harvesting methods required a great deal of manpower which has become increasingly scarce and more expensive in recent years.

The first type of mechanical tobacco harvester consisted primarily of a frame upon which the leaf primers would ride through the field as they manually removed the leaves and place them in various containers.

In recent years various other types of mechanical tobacco harvesters were developed wherein the harvester would straddle the row of tobacco plants and a rotating defoliator would strip the lower leaves from the plant onto a conveyor mechanism for transfer into a suitable receptacle. In several of these prior art harvesters a conveyor mechanism would be located on opposite sides of the row of tobacco plants and the leaves would be conveyed rearwardly into a pair of boxes mounted on the rear of the trailer. Other types of tobacco harvesters would convey the tobacco leaves rearwardly onto a transversely operable conveyor which would deposit the tobacco leaves into a wagon or box being pulled independently alongside the tobacco harvester.

In the co-pending application of Taylor et al, Ser. No.667,321, filed Mar. 16, 1976, a tobacco harvester is disclosed wherein a pair of defoliating means operate on opposite sides of the row of tobacco plants and the leaves which are harvested by the defoliator means are conveyed rearwardly and upwardly by a pair of parallel conveyor belt systems. The harvested leaves are deposited onto a transverse conveyor belt which in turn deposits the leaves into a tobacco curing box being carried by a trailer coupled to the harvester for movement alongside the harvester. The transverse conveyor belt may be shifted laterally so that the leaves will be deposited into the trailer when the harvester is straddling the first or second row of tobacco adjacent the fifth middle along which the tractor and trailer move. A hitch is disclosed in said co-pending application which will reciprocate the trailer forwardly and rearwardly relative to the harvester to insure the even distribution of tobacco leaves lengthwise of the box.

SUMMARY OF THE INVENTION

The present invention provides a new and improved hitch for coupling a trailer to a tobacco harvester which is capable of reciprocating the trailer forwardly and rearwardly relative to the harvester as the harvester moves along a row of tobacco plants.

The present invention provides a new and improved trailer hitch for reciprocating a trailer relative to a tobacco harvester wherein the hitch is mounted directly on the harvester so that the hitch can be permanently coupled to the hydraulic operating system of the harvester and so that it is unnecessary to modify the conventional trailer tongue structure in an any way whatsoever.

The present invention provides a new and improved trailer hitch for reciprocating a trailer forwardly and rearwardly relative to a tobacco harvester comprising a double acting piston and cylinder arrangement mounted on the harvester for movement of the piston parallel to the direction of movement of the harvester, a substantially vertically disposed lever pivoted intermediate the ends thereof on the side of said harvester with one end coupled to said piston and the opposite end thereof having means for coupling a trailer thereto. Suitable control means for the double acting hydraulic piston and cylinder are mounted on the harvester for control by a attendant to regulate the position of the trailer relative to an transverse conveyor on the harvester.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view of the hitch according to the present invention showing the positions of the trailer relative to the harvester in solid and phantom lines.

FIG. 2 is a top plan view of the hitch arrangement according to the present invention.

FIG. 3 is an enlarged detailed perspective of the hydraulic arrangement for operating the hitch according to the present invention.

DETAILED DESCRIPTION OF THE PREFERRED EMBODIMENTS

The tobacco harvester generally designated at 10 in FIG. 1 is identical to the tobacco harvester disclosed in the above-identified co-pending application need not be described in detail herein since the details do not form a part of the present invention. However, for the sake for coordinating the relationship of the trailer 20 with the harvester 10 certain basic details of the harvester will be described hereinafter.

The harvester 1 is comprised of a main frame 12 which is supported at the forward end by a tongue 14 adapted to be connected to a towing tractor and which is pivotally connected by means of post 16 to a rigid vertical support member 18 connected to the main frame 12. The pivoted tongue arrangement allows the tobacco harvester to straddle either the first row or the second row of tobacco adjacent the fifth middle along which the tractor (not shown) and the trailer 20 travel. The rear end of the main frame 12 is provided with depending support posts 22 which carry wheels 24. A pair of rotating defoliators are disposed one on each side of the row of tobacco plants for stripping the lowermost leaves from the tobacco plant as the harvester moves along the row. The leaves which are harvested by the defoliator means (not shown) are deposited onto a pair of parallel conveyors 26 only one of which is shown in FIG. 1. The tobacco leaves are moved rearwardly by the conveyors 26 and are then transported upwardly by two pairs of opposed conveyors 28 and 30, only one pair of which is shown in FIG. 1. The leaves are then deposited onto a transversely disposed conveyor 32 which can be shifted laterally depending upon which row of tobacco is being harvested. The leaves are deposited from the conveyor 32 into the large conventional tobacco curing box 34 which is placed on the trailer 20 travelling alongside the harvester.

The trailer 20 is provided with a rear platform 36 upon which an operator may stand to supervise the filling of the tobacco box 34 and to operate the controls for shifting the conveyor 32 as well as the controls for the hitch will be described hereinafter. The trailer 20 is provided with a tongue 38 rigidly secured to the front thereof and a connecting bar 40 is pivoted to the tongue 38 by means of pivot pin 42. The opposite end of the connecting bar 40 is pivotally connected to a laterally extending hitch bar 44 by means of a pivot pin 46. The hitch bar 44 is comprised of a flat steel bar having a plurality of apertures 48 spaced therethrough and is adapted to be inserted into a socket member 50 and secured therein by means of a pin 52 which will extend through a selected aperture 48. When the harvester is straddling the first row adjacent the fifth middle the hitch bar 44 will be inserted into the socket member 50 as shown in FIG. 2. However, when the harvester is straddling the second row from the fifth middle the hitch bar 44 will be inverted and inserted into the socket member 50' and secured therein by the bolt 52 which will extend through the aperture 51 which will be aligned with a selected aperture 48 in the hitch bar 44. The socket members 50 and 50' form a continuous aligned socket arrangement to accommodate the hitch bar 44 should a different hole 48 be selected for cooperation with the pin 52. The socket members 50 and 50' are secured to the lower end of a lever 54 which is in the form of a hollow steel box beam.

The lever 54 is pivoted to the main frame 12 by means of a pin 56 which extends through aligned apertures in a bracket 58, the lever 54 and the support plate 60 to which the bracket 58 is secured and which in turn is secured to the frame 12 by welding or the like.

A hydrualic cylinder 70 is pivoted at one end by means of the pivot pin 72 to a bracket 74 which is connected to the main frame 12. The double acting piston (not shown) within the cylinder 70 is connected to a piston rod 76 which in turn is pivotally connected to a flange 80 on the upper end of the lever 54 by means of a pivot pin 82. A first hydraulic hose 84 is connected between a control valve 86 and one end of the cylinder 70 and a second hydraulic hose 88 is connected between the control valve 86 and the opposite end of the cylinder 70. The control valve 86 is connected to hydraulic input and output conduits 90 and 92 and communication between the inlet and outlet conduits and the first and second hydraulic hoses 84 and 88 is controlled by means of a plunger 94 operable under the control of a pivoted control lever 96. The control valve 86 is of conventional construction and is adapted to supply hydraulic fluid under pressure selectively to one end or the other of the cylinder 70 for actuating the piston and piston rod 76 while simultaneously coupling the other end of the cylinder 70 to the outlet conduit 92.

Since the control valve arrangement is located at the forward end of the tobacco harvester and since the attendant riding on the platform 36 of the trailer 20 is located adjacent the rear of the trailer suitable operating means for the valve operating lever 96 have been provided. One end of the valve operating lever 96 is pivoted to the lower end of a rod 100 which is secured to an elongated control rod 102 which extends substantially the entire length of the harvester and which is slidably supported in bearings 104 on the top of a plurality of posts 106 spaced along the length of the frame 12. The control rod 102 is provided with a downwardly depending extension 108 at the rear end thereof which is disposed near the rear end of the trailer 20 for ready access by the operator standing on the platform 36.

In the operation of the trailer hitch according to the present invention the trailer can initially be disposed in the solid line position relative to the tobacco harvester as shown in FIG. 1. In this position the conveyor 32 will deposit tobacco leaves into the forward end of the tobacco box 34 on the trailer and the piston rod 76 will be in its fully retracted position within the cylinder 70 to dispose the pivoted lever 54 in the solid line position. When the operator standing on the platform 36 of the trailer 20 feels that sufficient tobacco has been accumulated in the front of the trailer he can readily grasp the extension 108 of the control rod 102 and push the control rod forwardly or to the left as viewed in FIG. 1. The shifting may be gradual so that the piston rod 76 will gradually be extended from the solid line to the phantom line position in FIG. 1 which will move the trailer 20 and the box 34 forwardly relative to the tobacco harvester so as to dispose the rear end of the box under the conveyor 32. The operator can shift the control rod 102 forwardly or rearwardly as well to position the tobacco receiving box at any desired longitudinal position relative to the transverse conveyor 32 to evenly distribute the tobacco leaves within the box 34. As disclosed more fully in the co-pending application the operator also has access to the control shaft 110 for shifting the end of the conveyor 32 laterally depending upon the row of tobacco which is being harvested.

The hydraulic arrangement for adjusting the hitch according to the present invention is mounted completely on the harvester that various types of trailers having conventional coupling arrangements on the forward end thereof can be readily coupled to the hitch bar 44 and be reciprocated relative to the harvester. By having the hydraulic operating arrangement for the hitch mounted on the frame of the harvester the control valve and the double acting hydraulic piston and cylinder arrangement can readily be tied into the hydraulic operating system for the harvester and it is not necessary to couple or uncouple any hydraulic lines each time a different trailer is hitched to the harvester.

While the invention has been particularly shown and described with reference to a preferred embodiment thereof it will be understood by those in the art that various changes in form and details may be made therein without departing from the spirit and scope of the invention.

What is claimed is:

1. A tobacco harvesting combination comprising a tobacco harvester having defoliator means adapted to remove the leaves from tobacco plants as the harvester transverses a row of tobacco plants and conveyor means for depositing said leaves to one side of said harvester, a trailer having means thereon for receiving said tobacco leaves and coupling means for adjustably coupling said trailer to said harvester in operative relation to receive the leaves from said conveyor means, said coupling means comprising lever means pivotally mounted on said harvester, hydraulic means mounted on said harvester and operatively connected to said lever means for pivoting said lever means and connecting means for connecting said trailer to said lever means whereby upon operation of said hydraulic means to pivot lever means said trailer will be moved relative to said harvester and said leaves will be evenly received and distributed throughout said trailer.

2. A tobacco harvester combination as set forth in claim 1 wherein said lever means is pivoted on one side of said harvester for movement in a substantially vertical plane parallel to the normal direction of movement of said harvester.

3. A tobacco harvester combination as set forth in claim 2 wherein hydraulic means is comprised of the double acting piston and cylinder arrangement whereby said lever means can be oscillated to shift said trailer forwardly and rearwardly relative to said harvester parallel to the direction of movement of the harvester.

* * * * *